US006530390B2

(12) United States Patent
Nagura et al.

(10) Patent No.: US 6,530,390 B2
(45) Date of Patent: Mar. 11, 2003

(54) PRESSURE REDUCING VALVE

(75) Inventors: Shinobu Nagura, Tochigi-ken (JP); Shuuji Hori, Tochigi-ken (JP)

(73) Assignee: Komatsu Limited, Tokyo (JP)

( * ) Notice: Subject to any disclaimer, the term of this patent is extended or adjusted under 35 U.S.C. 154(b) by 0 days.

(21) Appl. No.: 09/883,686

(22) Filed: Jun. 18, 2001

(65) Prior Publication Data

US 2002/0000245 A1 Jan. 3, 2002

(30) Foreign Application Priority Data

Jun. 23, 2000 (JP) ....................................... 2000-188935

(51) Int. Cl.[7] .................................................. G01D 7/00
(52) U.S. Cl. ......................................... 137/51; 137/102
(58) Field of Search ............................ 137/102, 505.14, 137/505.15, 51

(56) References Cited

U.S. PATENT DOCUMENTS 3,927,654 A * 12/1975 Perr ........................... 123/387
4,909,219 A * 3/1990 Perr et al. .................... 123/387
5,597,012 A * 1/1997 Moinard ................ 137/505.13
6,138,810 A * 10/2000 Fujii et al. ............... 192/109 F

* cited by examiner

*Primary Examiner*—Stephen M. Hepperle
(74) *Attorney, Agent, or Firm*—Bell, Boyd & Lloyd LLC

(57) ABSTRACT

The invention provides a pressure reducing valve in which a minimum pressure can be secured even when an engine speed is reduced. A pressure reducing valve changing an output pressure in correspondence to an engine speed has means for outputting a predetermined minimum pressure when the engine speed is equal to or less than a first predetermined rotational speed.

2 Claims, 6 Drawing Sheets

PRESSURE REDUCING VALVE

BACKGROUND OF THE INVENTION

1. Field of the Invention

The present invention relates to a pressure reducing valve. In particular, the present invention relates to a pressure reducing valve changing an output pressure in correspondence to an engine speed.

2. Description of the Related Art

The following means has been employed in a conventional construction vehicle such as a wheel loader, a bulldozer or the like.

A delivery flow amount of a pump is changed in correspondence to an operation amount of a pilot operating valve. The pilot operating valve reduces a pressure of a supplied pressurized oil in accordance with the operation amount and outputs the oil. In the case that it is intended to change the pump discharge flow amount in correspondence to the engine speed, the pressure of the pressurized oil supplied to the pilot operating valve is changed.

A hydraulic circuit mentioned above is shown, for example, in Japanese Laid-Open Patent Publication Nos. 49-71353 and 10-122363.

FIG. 5 shows an embodiment of a hydraulic circuit having the same function as that of a hydraulic circuit changing the supplied pressure to the pilot operating valve in correspondence to the engine speed, which is disclosed in the publication mentioned above. A variable displacement type pump 1' is connected to various kinds of actuators, for example, a traction motor of a vehicle, a cylinder and the like which are not illustrated. A displacement controller 4' of the variable displacement type pump 1' is connected to an output side of an output circuit 6' in an operating apparatus 5'. A fixed orifice 8' is provided in a delivery pipe passage of a fixed displacement type pump 2'. An upstream pressure of the fixed orifice 8' is increased in correspondence to the engine speed.

Accordingly, a differential pressure between front and rear of the fixed orifice 8' becomes larger in correspondence to the engine speed.

In this case, the pressure reducing valve inherently has a function of making an output pressure uniform. In the normal pressure reducing valve, the output pressure of the pressure reducing valve is made uniform due to a balance between an output side pressure P1' and a spring 9*a*' provided in the pressure reducing valve. When the balance of the force is changed, the output pressure is also changed. In this case, the pressure reducing valve can not, of course, output a pressure more than the supplied pressure.

The pressure reducing valve 7' shown in FIG. 5 applies the differential pressure between front and rear of the fixed orifice 8' so as to change the output pressure, in addition to the balance. That is, an upstream pressure P2' of the fixed orifice 8' is applied in a direction of a position (A)' in FIG. 5 so as to change the balance in such a manner as to increase the output pressure of the pressure reducing valve. A downstream pressure P3' of the fixed orifice 8' is applied in a direction of a position (B)' so as to change the balance in such a manner as to reduce the output pressure of the pressure reducing valve. The differential pressure between front and rear of the fixed orifice 8' is changed on the basis of the engine speed. That is, the force applied in the direction of the position (A)' is increased in accordance with an increase of the engine speed, and the output pressure of the pressure reducing valve 7' becomes large.

In the hydraulic pressure shown in FIG. 5, when the engine speed is increased, the pressure P1' supplied to the operating valves 6*a*', 6*b*' is increased. Accordingly, when the engine speed is increased, the maximum pressure output by the operating apparatus 6' is increased.

The output circuit of the operating apparatus 6' has a pair of pilot operating valves 6*a*' and 6*b*'. Each of the pilot operating valves 6*a*' and 6*b*' is a pressure reducing valve, and changes the output pressure in correspondence to an amount of incline of the operating lever 5*a*'. The output pressure is zero at an illustrated neutral position. When the operating lever 5*a*' is tilted in a direction of a, the pressure in correspondence to the amount of incline of the operating lever 5*a*' is output via the pilot operating valve 6*a*'. At this time, in another pilot operating valve 6*b*', the output pressure keeps zero.

The displacement controller 4' changes the displacement of the variable displacement type pump 1' in correspondence to the output pressure of the operating apparatus 6'. In the hydraulic circuit shown in FIG. 5, it is designed such that the displacement of the variable displacement type pump 1' becomes maximum at the maximum output pressure of the operating apparatus 6' in a certain great area or more of the engine speed. Accordingly, when the engine speed is increased, the maximum displacement that the variable displacement type pump 1' can operate is increased.

FIG. 6 shows a change of the output pressure of the pressure reducing valve 7' in correspondence to the engine speed.

However, in the reducing control valve mentioned above, since the pressure supplied to the operating apparatus 6' is small in a low rotational speed area of the engine, the pressure P5' output to the displacement controller 4' is also small even when the operating lever is largely operated. Accordingly, the displacement of the variable displacement type pump 1' is small and there is generated a case that the displacement is less than a necessary flow amount in the actuator.

An example is shown here. In the construction vehicle such as the wheel loader, the bulldozer or the like mentioned above, a plurality of working machines or traveling apparatuses are operated by the operating apparatus 6'. When the engine speed is reduced for achieving a low speed travel, and the pressure P1' supplied to the operating apparatus 6' is reduced in correspondence thereto so as to reduce the displacement of the variable displacement type pump 1', there may be a case that a flow amount of the traveling apparatus which does not require a large flow amount due to a low speed travel is sufficient but a flow amount applied to the working machine performing a work without relation to the traveling speed is insufficient.

Further, although an illustration is omitted, there is a requirement that a command pressure applied to the traveling apparatus of the vehicle is intended to be sufficiently secured for securing a vehicle speed and a traction force even in the case that the engine speed is reduced when the output pressure of the operating apparatus 6' shown in FIG. 5 is used as the command pressure applied to the traveling apparatus of the vehicle. At this time, there may be a case that the command pressure can not be sufficiently secured in the hydraulic circuit employing the pressure reducing valve 7' shown in FIG. 5.

SUMMARY OF THE INVENTION

An object of the present invention is to provide a pressure reducing valve which can reduce an engine speed and secure a minimum pressure.

In accordance with a main aspect of the invention, there is provided a pressure reducing valve consisting of a pressure reducing valve portion whose output pressure is uniform and a differential pressure responding portion comprising springs changing the output pressure of the reducing valve portion. Spring forces of the springs are adjusted by differential pressure between front and rear of a fixed orifice provided at a delivery pipe passage of a fixed displacement pump whose rotational speed is in correspondence to an engine speed. In this pressure reducing valve, the output pressure of the pressure reducing valve portion is changed in correspondence to an engine speed by the spring forces of the springs applied to a side in the pressure reducing valve portion to which output pressure of the pressure reducing valve portion is applied.

Consequently, in the pressure reducing valve changing the output pressure in correspondence to the rotational speed of the engine, the output pressure does not become equal to or less than a predetermined pressure at a rotational speed equal to or less than the first predetermined rotational speed even when the engine speed becomes low. Accordingly, it is possible to optionally set a target minimum force. Further, it is possible to provide the pressure reducing valve which can change the output pressure in correspondence to the engine speed at the first predetermined rotational speed or more.

Preferably, in the pressure reducing valve, a spring force of the spring is applied to a side opposite to the side in the pressure reducing valve portion to which the output pressure of the pressure reducing valve portion is applied.

As a result, in the same manner as that of the main aspect, in the pressure reducing valve changing the output pressure in correspondence to the rotational speed of the engine, the output pressure does not become equal to or less than a predetermined pressure at a rotational speed equal to or less than the first predetermined rotational speed even when the engine speed becomes low. Further, the output pressure does not become equal to or more than a predetermined pressure when the engine speed is over the second predetermined rotational speed larger than the first predetermined rotational speed. Accordingly, it is possible to optionally set a target minimum pressure and maximum pressure. Further, it is possible to provide the pressure reducing valve which can change the output pressure in correspondence to the engine speed in a range equal to or more than the first predetermined rotational speed and equal to or less than the second predetermined rotational speed.

DESCRIPTION OF THE PREFERRED EMBODIMENTS

Figure 5:
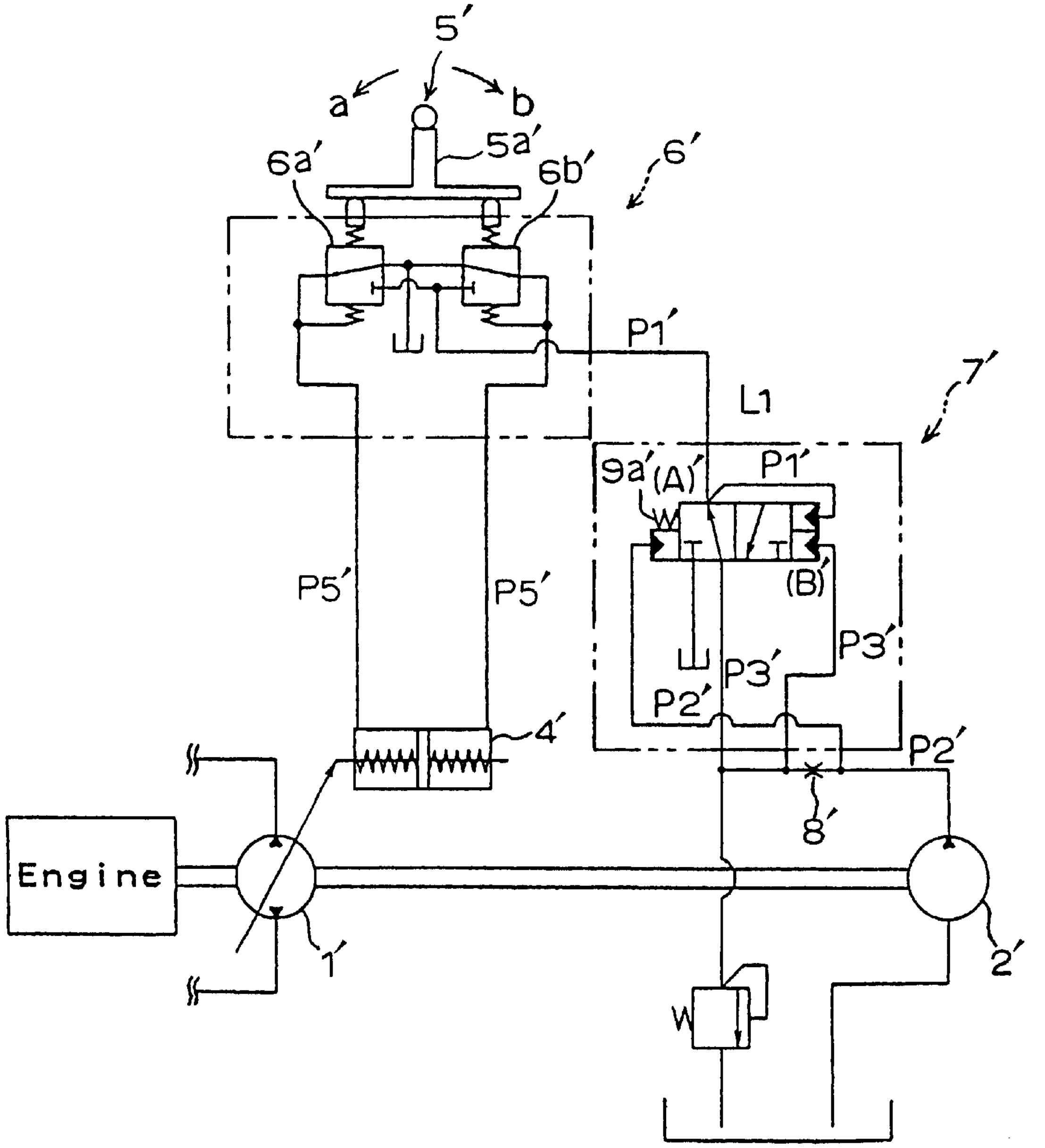
FIG. 5 PRIOR ART
FIG. 5 is a hydraulic circuit diagram using a pressure reducing valve changing an output pressure in correspondence to an engine speed in accordance with a conventional art.

In the present invention, a difference from the conventional pressure reducing valve shown in FIG. 5 exists in a pressure reducing valve arranged in a hydraulic circuit. The other circuit structures and constituting elements are substantially the same as the conventional circuit structures and constituting elements. Accordingly, the following description will be mainly given of the pressure reducing valve. The same reference numerals are used for the same elements as those of the conventional hydraulic circuit shown in FIG. 5.

Figure 1:
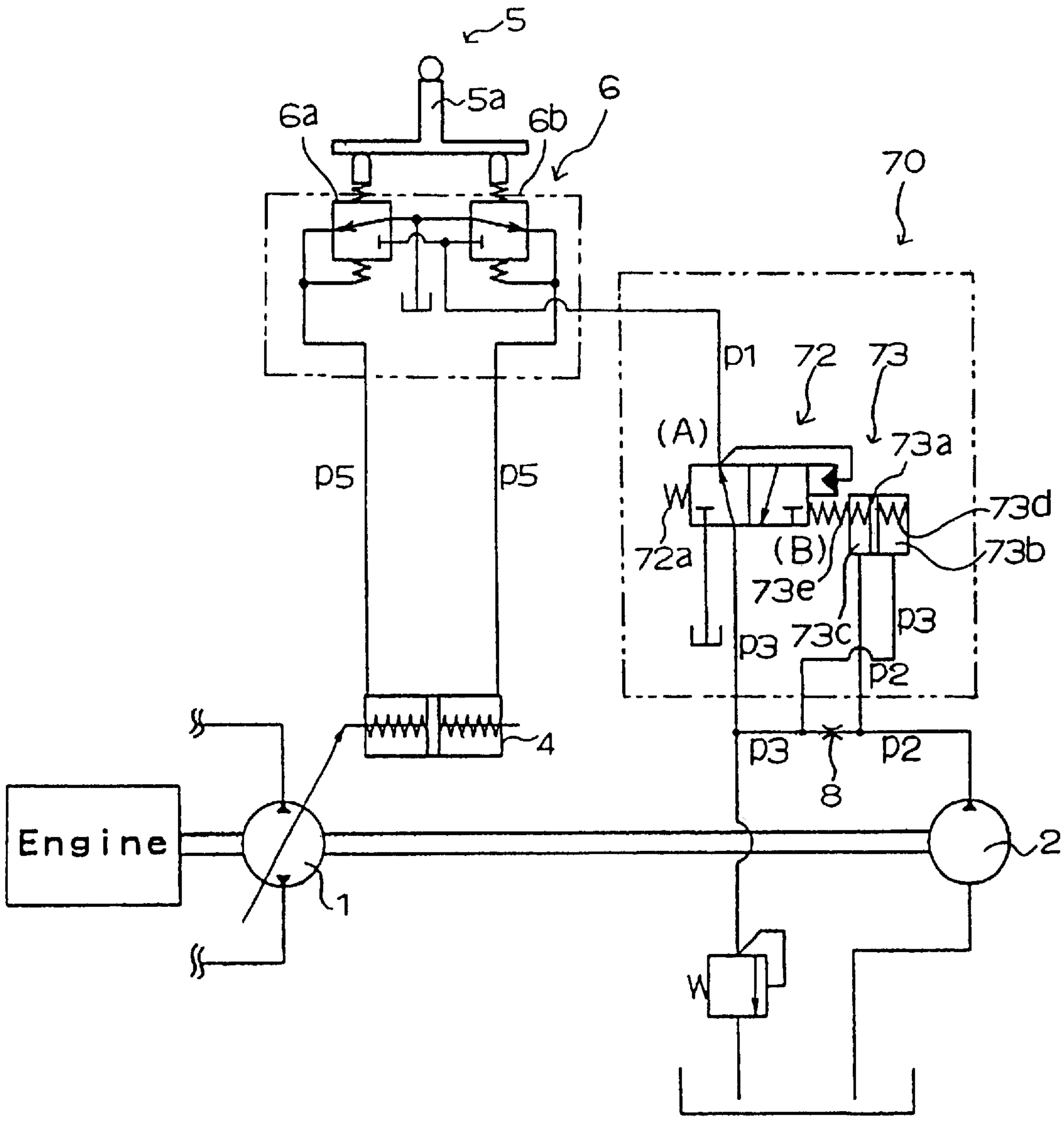
FIG. 1 is a hydraulic circuit diagram of a hydraulic power transmitting apparatus in accordance with a first embodiment of the present invention.

FIG. 1 shows a hydraulic circuit employing a pressure reducing valve in accordance with a first embodiment of the present invention.

A pressure reducing valve 70 is provided with a pressure reducing valve portion 72 having the same structure as that of a normal pressure reducing valve in which an output pressure is constant, and a differential pressure responding portion 73 applying a spring force in correspondence to a pressure between front and rear of a fixed orifice 8 provided at a delivery pipe passage of a fixed displacement pump 2 to a closed position side (B) of the pressure reducing valve.

At first, a description will be given of a structure of the differential pressure responding portion 73.

The differential pressure responding portion 73 is provided with a piston 73*a*, and a first oil chamber 73*b* and a second oil chamber 73*c* which are sectioned by the piston 73*a*. A second spring 73*d* is provided in the first oil chamber 73*b* and a downstream pressure P3 of the fixed orifice 8 is applied thereto.

A first spring 73*e* is provided in the second oil chamber 73*c*, and an upstream pressure P2 of the fixed orifice 8 is applied thereto. In the same manner as that of the conventional hydraulic circuit, when the engine speed is increased, the upstream pressure P2 is increased. The first spring 73*e* is provided so as to move the pressure reducing valve portion 72 in the direction of the position (B). The position (B) corresponds to a direction of reducing the output pressure of the pressure reducing valve 70.

Next, a description will be given of an operation of the differential pressure responding portion 73.

When the engine speed is small, the upstream pressure P2 of the fixed orifice 8 becomes small, and the pressure within the second oil chamber 73*c* becomes small. The piston 73*a* moves in a leftward direction in FIG. 1. At this time, the first spring 73*e* is compressed and the spring force of the first spring 73*e* is increased. Accordingly, the force for moving the pressure reducing valve portion 72 in the direction of the position (B) is increased and the output pressure of the pressure reducing valve 70 is reduced.

A position of the piston 73*a* of the differential pressure responding portion 73 shown in FIG. 1 shows a state in which the engine speed is between R1 and R2. Reference symbol R1 denotes a first predetermined rotational speed. Reference symbol R2 denotes a second predetermined rotational speed. Further, R1 is smaller than R2, and a magnitude and a range of each of R1 and R2 are suitably set.

When the engine speed becomes smaller than R1, the piston 73*a* reaches an end portion in a leftward direction in FIG. 1 of the differential pressure responding portion 73, that is, a position at which the first spring 73*e* can not be compressed any more. Accordingly, the force applied to the pressure reducing valve portion 72 does not correspond to the engine speed. That is, the pressure reducing valve 70 has the same operation as that of the normal pressure reducing valve having the constant output pressure, at the engine speed equal to or less than R1.

Next, a description will be given of a case that the engine speed is high. At this time, the upstream pressure P2 of the fixed orifice 8 also becomes high, and the pressure within the second oil chamber 73*c* also becomes high. The piston 73*a* moves in a rightward direction in FIG. 1. At this time, the first spring 73*e* is expanded and the spring force of the first spring 73*e* becomes small. Accordingly, the force for moving the pressure reducing valve portion 72 in the direction of the position (B) becomes small and the output pressure of the pressure reducing valve 70 becomes large.

The piston 73*a* moves in a rightward direction in FIG. 1 in correspondence to an increase of the engine speed, however, reaches an end portion in the rightward direction and can not move any more, at the rotational speed equal to or more than R2. At this time, the spring force of first spring 73*e* applied to the pressure reducing valve portion 72 becomes constant. Accordingly, the force applied to the pressure reducing valve portion 72 does not correspond to the engine speed. That is, the pressure reducing valve 70 has the same operation as that of the normal pressure reducing valve having a constant output pressure, at an engine speed equal to or more than R2.

As mentioned above, in accordance with the first embodiment, the output pressure of the pressure reducing valve 70 can be set to a minimum output pressure P min in a range equal to or less than the engine speed R1. This value P min corresponds to a predetermined minimum pressure.

In a range between the rotational speeds R1 and R2, the output pressure can be changed in correspondence to the engine speed. In the rotational speed equal to or more than R2, it can be set to a maximum output pressure P max. This value P max corresponds to a predetermined maximum pressure.

Figure 4A:
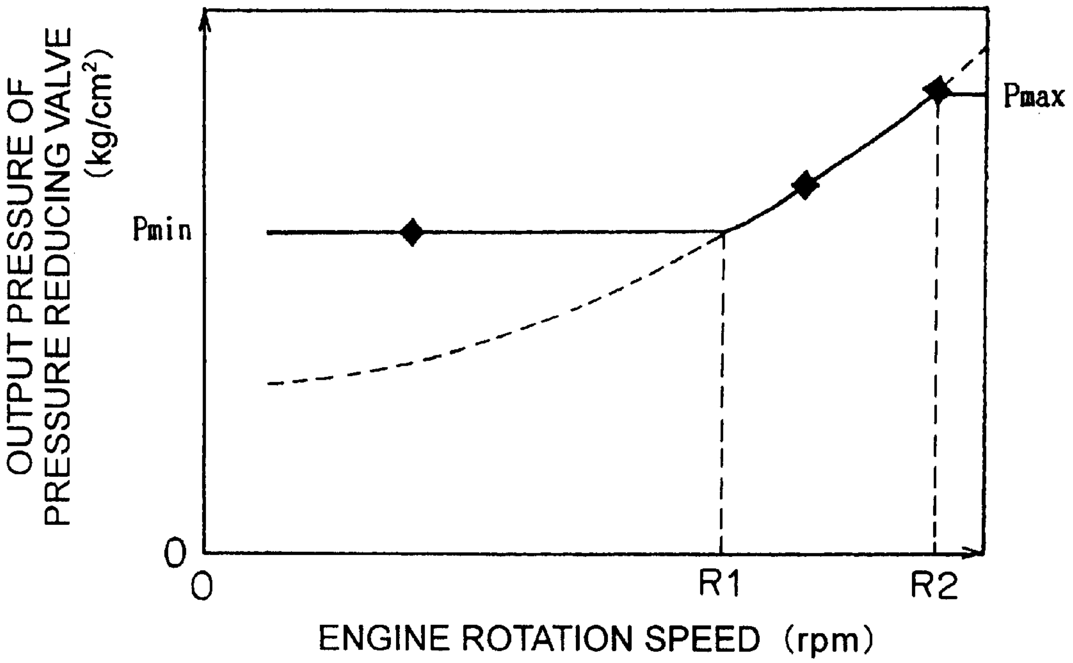
FIG. 4 is a graph showing a change of an output pressure in correspondence to an engine speed in a pressure reducing valve of the present invention.

A relation between the engine speed and the output pressure of the pressure reducing valve 70 is shown in FIG. 4A.

Further, the minimum output pressure P min and the maximum output pressure P max can be optionally set by suitably selecting the spring force of each of the second and first springs 73*d* and 73*e* and a orifice diameter of the fixed orifice 8.

Figure 2:
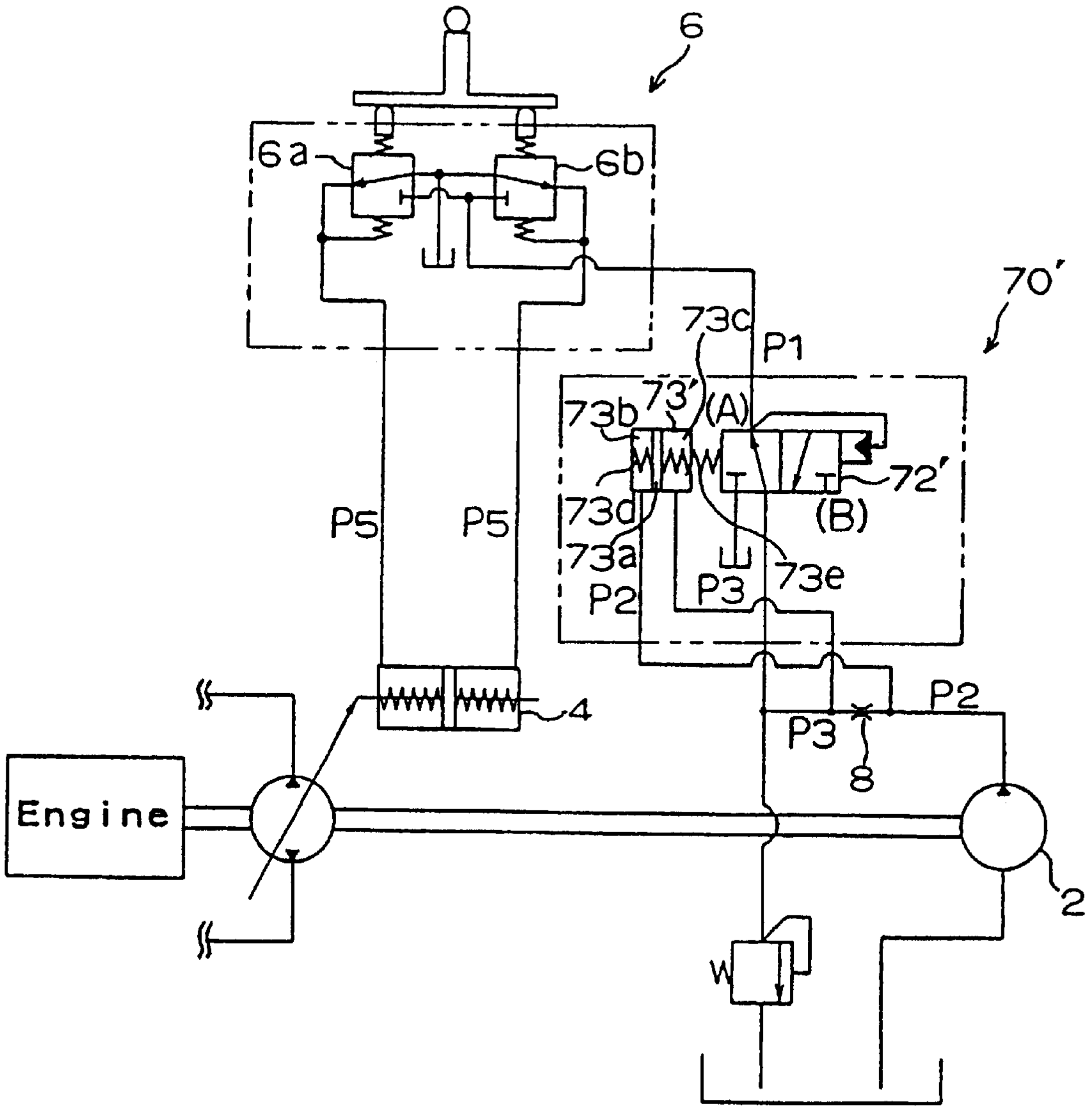
FIG. 2 is a hydraulic circuit diagram of a hydraulic power transmitting apparatus in accordance with a second embodiment of the present invention.

FIG. 2 shows a second embodiment in accordance with the present invention.

A pressure reducing valve 70' is provided, in the same manner as that of the first embodiment, with a pressure reducing valve portion 72' and a differential pressure responding portion 73' each of which has a constant output pressure by itself. Difference in comparison with the first embodiment shown in FIG. 1 are as follows. The spring 72*a* for moving the pressure reducing valve portion 72 in the direction of the position (A) is not provided, and instead, the differential pressure responding portion 73' is provided so as to move the pressure reducing valve portion 72' in the direction to the position (A). The other circuit structures and constituting elements are substantially the same as those of the first embodiment. The same reference numerals are used for substantially the same circuits and constituting elements as those in FIG. 1.

At first, a description will be given of a structure of the differential pressure responding portion 73'.

The differential pressure responding portion 73' is provided with a piston 73*a*, and a first oil chamber 73*b* and a second oil chamber 73*c* which are sectioned by the piston 73*a*. A second spring 73*d* is provided in the first oil chamber 73*b* and an upstream pressure P2 of the fixed orifice 8 is applied thereto. In the same manner as that of the conventional hydraulic circuit, the upstream pressure P2 is increased when the engine speed is increased.

A first spring 73*e* is provided in the second oil chamber 73*c*, and a downstream pressure P3 of the fixed orifice 8 is applied thereto. The first spring 73*e* is provided so as to move the pressure reducing valve portion 72' in the direction to the position (A). The position (A) corresponds to a direction of decreasing the output pressure of the pressure reducing valve 70.

Next, a description will be given of an operation of the differential pressure responding portion 73'.

When the engine speed is small, the upstream pressure P2 of the fixed orifice 8 becomes small, and the pressure within the pressure chamber 73*b* becomes small. The piston 73*a* moves in a leftward direction in FIG. 2. At this time, the first spring 73*e* is expanded and the spring force of the first spring 73*e* is reduced. Accordingly, the force for moving the pressure reducing valve portion 72' in the direction to the position (B) is increased and the output pressure of the pressure reducing valve 70' is reduced.

A position of the piston 73*a* of the differential pressure responding portion 73' shown in FIG. 2 shows a state in which the engine speed is between R1 and R2.

When the engine speed becomes smaller than R1, the piston 73*a* reaches an end portion in a leftward direction in FIG. 2 of the differential pressure responding portion 73', that is, a position at which the first spring 73*e* can not be expanded any more. Accordingly, the force applied to the pressure reducing valve portion 72' does not correspond to the engine speed. That is, the pressure reducing valve 70' has the same operation as that of the normal pressure reducing valve having the constant output pressure, at the engine speed equal to or less than R1.

In the same manner as that of the first embodiment shown in FIG. 1, in the case that the engine speed is high, the piston 73*a* moves in a rightward direction in FIG. 2. Then, the first spring 73*e* is compressed and the spring force of the first spring 73*e* becomes large. Accordingly, the output pressure of the pressure reducing valve 70' becomes large.

Further, at the rotational speed equal to or more than R2, the piston 73*a* reaches an end portion in the rightward direction and can not move further. Accordingly, the pressure reducing valve 70' has the same operation as that of the normal pressure reducing valve having a constant output pressure, at an engine speed equal to or more than R2.

As mentioned above, in accordance with the second embodiment, the output pressure of the pressure reducing valve 70' can be set to a minimum output pressure P min in a range equal to or less than the engine speed R1. In a range between the rotational speeds R1 and R2, the output pressure can be changed in correspondence to the engine speed. In the rotational speed equal to or more than R2, it can be set to the maximum output pressure P max. A relation between the engine speed and the output pressure of the pressure reducing valve 70' at this time is the same as that of the first embodiment and is as shown in FIG. 4A.

Figure 3:
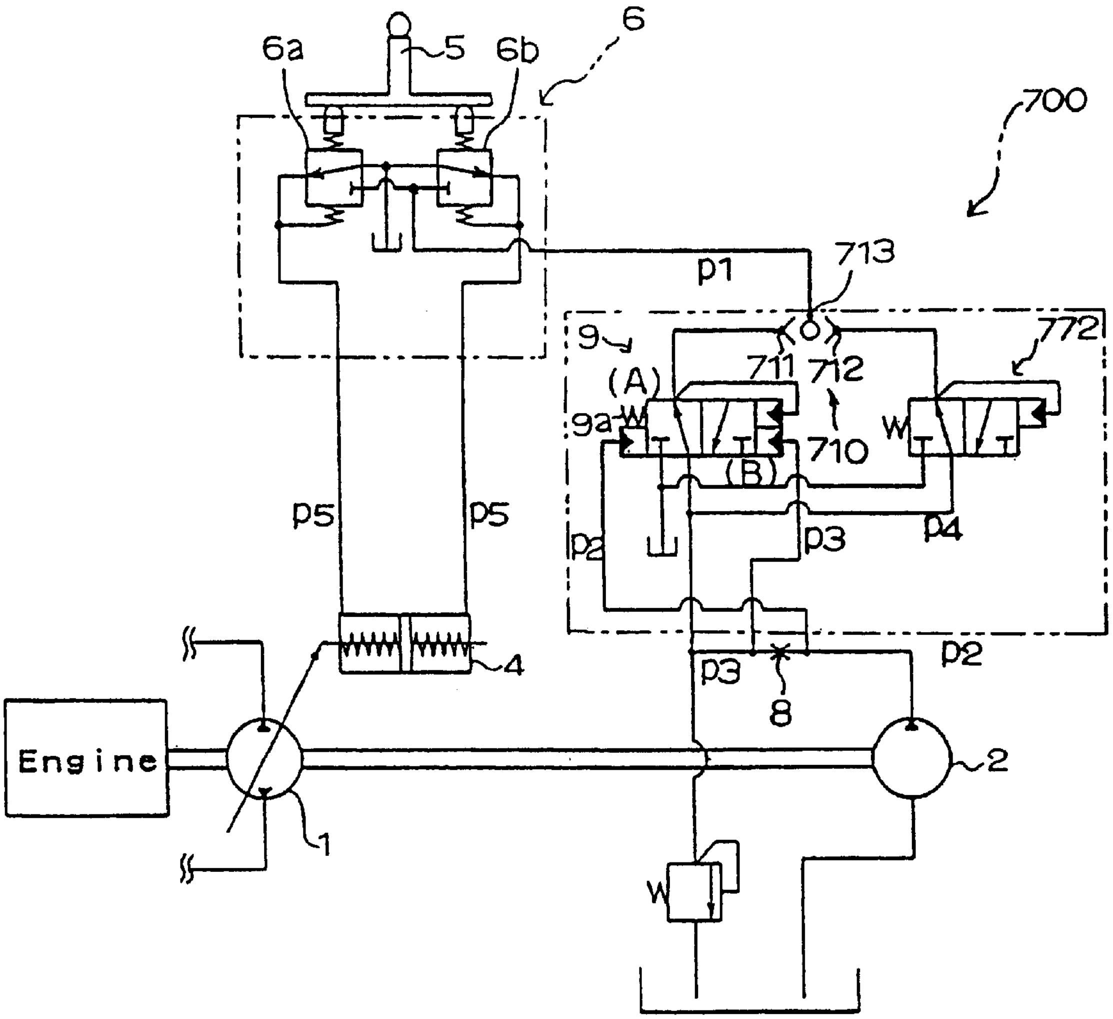
FIG. 3 is a hydraulic circuit diagram of a hydraulic power transmitting apparatus in accordance with a third embodiment of the present invention.

FIG. 3 shows a third embodiment in accordance with the present invention.

A pressure reducing valve 700 is constituted by two kinds of pressure reducing valves 9 and 772. The pressure reducing valve 9 has the same structure as the conventional pressure reducing valve 7' as shown in FIG. 5 changing the output in correspondence to the engine speed. The pressure reducing valve 9 can not optionally set the minimum output pressure P min and the maximum output pressure P max shown in the first or second embodiments. The pressure reducing valve 772 is the same as the normal pressure reducing valve in which the output pressure is constant irrespective to the engine speed. Since the structures and operations of the pressure reducing valves 9 and 772 are the same as those of the conventional art mentioned above, they are omitted.

The delivered pressurized oil of the fixed displacement pump 2 and the pressurized oil having the pressure P3 after passing through the fixed orifice 8 are supplied to two pressure reducing valves 9 and 772 in parallel. The output pressurized oil of the pressure reducing valve 9 is supplied to one input port 711 of a shuttle valve 710. The output pressure of the pressure reducing valve 772 is supplied to another input port 712 of the shuttle valve 710. A higher one of the output pressure of each of the pressure reducing valves 9 and 772 is selected by the shuttle valve 710 and is supplied to the operating apparatus 6'.

Figure 6:
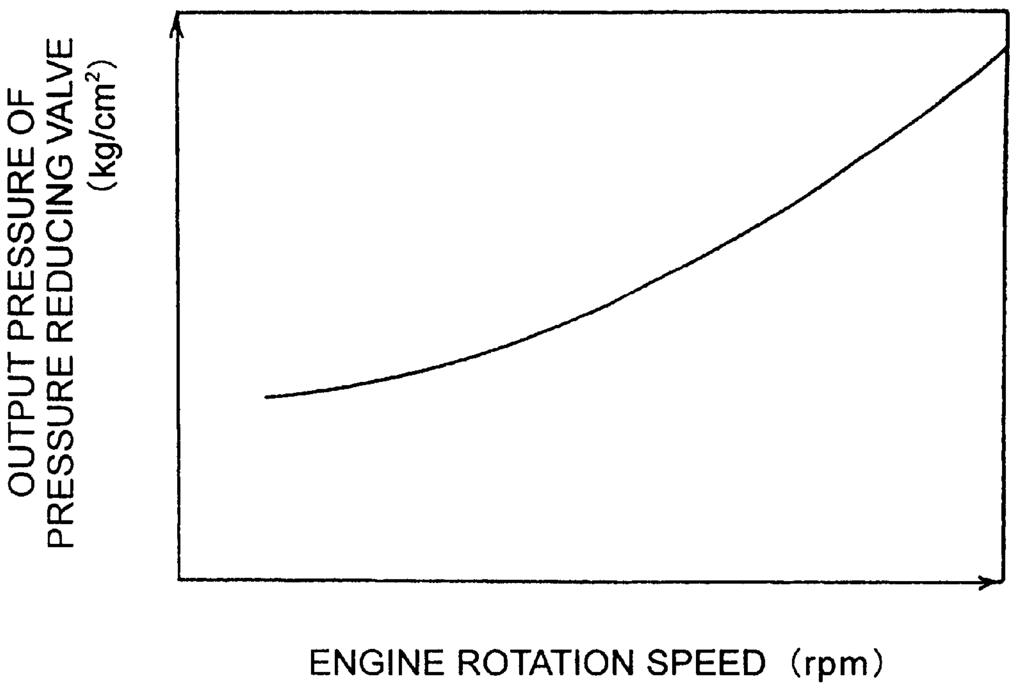
FIG. 6 PRIOR ART
FIG. 6 is a graph showing a change of an output pressure in correspondence to the engine speed in the conventional pressure reducing valve.

In this case, the relation between the engine speed and the output pressure of the pressure reducing valve 9 is the same as that in FIG. 6. The output pressure of the pressure reducing valve 772 is constant irrespective to the engine speed. A case of setting the output pressure of the pressure reducing valve 772 to P min is assumed.

At this time, in a range that the engine speed is equal to or less than R1, the output pressure of the pressure reducing valve 772 is higher. Accordingly, when the engine speed is equal to or less than R1, the output pressure of the pressure reducing valve 700 is the minimum output pressure P min. When the engine speed is in a range equal to or more than R1, the output pressure of the pressure reducing valve 9 becomes higher. Accordingly, when the engine speed is equal to or more than R1, the output pressure of the pressure reducing valve 700 becomes higher in accordance with an increase of the engine speed.

Figure 4B:
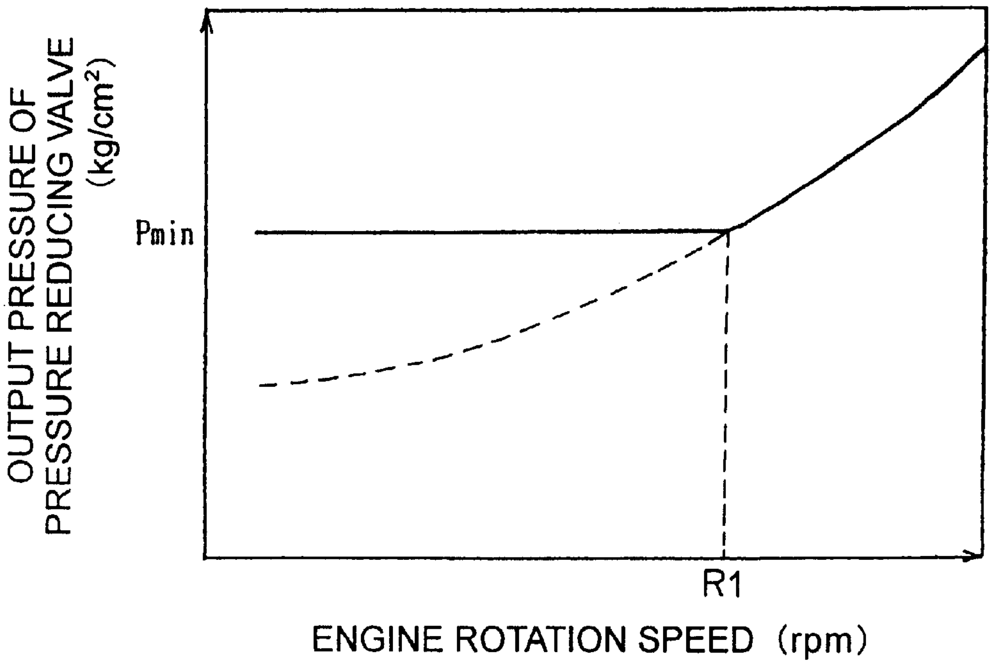

FIG. 4B shows a relation between the output pressure of the pressure reducing valve 700 and the engine speed. In the same manner as those of the first and second embodiments, when the engine speed is equal to or less than R1, the output pressure can be kept constant. A difference from FIG. 4A showing the first and second embodiments exists in a point that the maximum output pressure P max can not be optionally set. The maximum output pressure in the pressure reducing valve 700 becomes the supply pressure P3 to the pressure reducing valves and 772.

What is claimed is:

1. A pressure reducing valve of an apparatus having a fixed displacement pump whose rotational speed is in correspondence to an engine speed, and a fixed orifice provided in a delivery pipe passage of said fixed displacement pump, the pressure reducing valve changing an output pressure in correspondence to said engine speed, said pressure reducing valve comprising:

a pressure reducing valve portion and a differential pressure responding portion;

said pressure reducing valve portion supplying pressurized oil downstream of said fixed orifice and having a uniform output pressure balanced by an output pressure of said pressure reducing valve portion and a spring load applied to the same pressure reducing valve portion;

said differential pressure responding portion comprising:

a piston moving within a predetermined stroke range;

a first spring provided between said piston and said pressure reducing valve portion, a spring force of said first spring being adjusted in correspondence to a position of said piston;

a second spring provided at an opposite side of the first spring and applying force to said piston;

a second oil chamber formed at one side of said differential pressure responding portion sectioned by said piston where said first spring is provided; and a first oil chamber formed at the other side of said differential pressure responding portion where said second spring is provided;

wherein said first spring applies force to a side of said pressure reducing valve where said output pressure is applied, pressurized oil downstream of said fixed orifice is supplied to said first oil chamber, and pressurized oil upstream of said fixed orifice is supplied to said second oil chamber.

2. A pressure reducing valve of an apparatus having a fixed displacement pump whose rotational speed is in correspondence to an engine speed, and a fixed orifice provided in a delivery pipe passage of said fixed displacement pump, the pressure reducing valve changing an output pressure in correspondence to said engine speed, said pressure reducing valve comprising:

a pressure reducing valve portion and a differential pressure responding portion;

said pressure reducing valve portion supplying pressurized oil downstream of said fixed orifice and having a uniform output pressure balanced by an output pressure of said pressure reducing valve portion and a spring load applied to the same pressure reducing valve portion;

said differential pressure responding portion comprising:

a piston moving within a predetermined stroke range;

a first spring provided between said piston and said pressure reducing valve portion, a spring force of said first spring being adjusted in correspondence to a position of said piston;

a second spring provided at an opposite side of the first spring and applying force to said piston;

a second oil chamber formed at one side of said differential pressure responding portion sectioned by said piston where said first spring is provided; and a first oil chamber formed at the other side of said differential pressure responding portion where said second spring is provided;

wherein said first spring applies force to a side of the pressure reducing valve opposite to the side where said output pressure is applied, pressurized oil upstream of said fixed orifice is supplied to said first oil chamber, and pressurized oil downstream of said fixed orifice is supplied to said second oil chamber.

* * * * *